Sept. 25, 1973          S. P. BINGHAM          3,761,245
NICKEL SEGREGATION PROCESS USING METALLIC IRON AS REDUCTANT
Filed Sept. 9, 1970
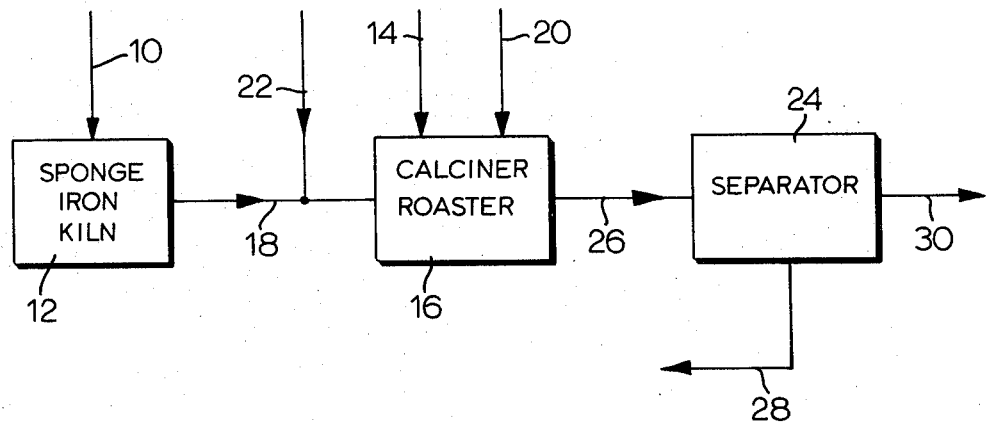
INVENTOR.
SEYMOUR P. BINGHAM

United States Patent Office 3,761,245
Patented Sept. 25, 1973

3,761,245
NICKEL SEGREGATION PROCESS USING METALLIC IRON AS REDUCTANT
Seymour P. Bingham, Boston, Mass., assignor to Stone & Webster Engineering Corporation, Boston, Mass.
Filed Sept. 9, 1970, Ser. No. 70,756
Claims priority, application Great Britain, Jan. 9, 1970, 1,279/70
Int. Cl. C22b 23/02
U.S. Cl. 75—82      22 Claims

ABSTRACT OF THE DISCLOSURE

Nickel is recovered from nickel-containing materials by reaction with a chloride-containing material, such as calcium chloride, and a magnetic iron-containing material, such as sponge iron.

---

This invention relates to the production of nickel, more particularly to the separation of nickel from low grade sources of nickel.

Nickel is a valuable metal and finds widespread use in many fields. It is used as a construction material, mainly in the form of alloys such as stainless steels and non-ferrous alloys, for example, copper-nickel alloys and chromium-nickel alloys, because of its strength and corrosion resistance. Nickel also is used in electroplating, magnetic alloys, wrought and cast low-alloy steels, alkaline storage batteries, magnetics, ceramics, electronics, as a catalyst in organic synthesis, and in coins.

A large proportion of the world's production of nickel is at present obtained from nickel sulfide ores mined from large deposits in Canada. Nickel also is found as nickeliferous laterite ores.

Deposits of such nickeliferous ores containing generally between about 1 and about 3 percent nickel occur in Cuba, New Caledonia, the United States of America, Indonesia, the Philippines, Japan, Latin America, Africa, and the Soviet Union.

Such nickeliferous laterite ores usually take the form of either a nickeliferous-iron laterite or a nickeliferous-silicate laterite. The ore deposits were formed by chemical decomposition of ultrabasic igneous rocks carrying nickel and are characterized by residual or superficial enrichment of iron at the surface and enrichment of nickel in a saprolitic transitional zone between the iron-rich laterite at the surface and the fresh bed rock in depth. The iron-rich laterite, known as limonite, is high in iron and relatively low in nickel, silica and magnesia. In the saprolitic zone, the iron content falls off and contents of silica, nickel and magnesia are increased, and the low iron laterite ore in this region is known as garnierite.

It is characteristic of nickeliferous-laterite ores that nickel minerals found in such deposits are extremely finely disseminated and cannot be concentrated by fine grinding or other methods of mechanical concentration. This is in contrast to the nickel sulphide ores which are readily upgraded to around 10 to 15% nickel content by flotation techniques due to the occurrence of the nickel sulphide as discrete particles.

Nickel in the limonite occurs usually as nickel oxide adsorbed on the surface of iron oxide minerals. In the garnierite, nickel occurs essentially as complex nickel-magnesia silicates or iron-nickel complex silicates in which nickel replaces part of the iron molecule. Small quantities of other metals, such as cobalt and chromium are dispersed throughout the ore body.

Several proposals have been made to recover nickel from nickeliferous-laterite ores. In one such process, the ore is roasted with a reducing agent to convert nickel in these minerals to the metallic form. The ore then is subjected to a leaching process with an ammonium carbonate solution whereby the nickel is extracted by being dissolved as a nickel-ammonia complex. After separation from solids, basic nickel carbonate is precipitated by removal of excess ammonia with steam. While this process is capable of providing high recoveries on high iron content ores, it is expensive to operate and poor recoveries of nickel are obtained from garnierite ores.

Another prior art process consists of dissolving nickel from ground ore using sulphuric acid in an autoclave at high temperature and pressure. High recoveries of nickel can be obtained but the process cannot be employed on ores containing more than small quantities of magnesia because magnesia also is dissolved in the sulphuric acid.

In another prior art process, the ore may be smelted in an electric furnace and a ferronickel product recovered. However, smelting of large amounts of ore to recover small amounts of nickel is expensive. In addition, the areas where large deposits of nickeliferous ores are located do not have readily available cheap sources of electricity.

The present invention relates to a method of recovering nickel from nickel-containing materials.

The term "nickel-containing material" used herein includes those materials which are oxides or salts of nickel, for example, the silicates occurring in garnierite. Such silicates may be considered as $NiO \cdot SiO_2$.

The process of the invention includes subjecting a nickel-containing material to the sequential or simultaneous action of a chloride-containing material and a magnetic iron-containing material.

The nickel-containing material may be nickeliferous-laterite ore, for example, a limonite or garnierite ore, nickel-containing tailings, a treated laterite ore or a nickel oxide-containing material obtained by roasting nickel sulphide ores.

The process hereinafter will be described with reference to nickeliferous-laterite ores, but it will be understood that the process is applicable to other nickel-containing materials.

The invention involves reaction of the nickeliferous-laterite ore with a chloride and a magnetic iron-containing material. Such steps are preferably carried out simultaneously, although sequential reaction, first with chloride followed by iron-containing material, or first with iron-containing material followed by chloride, alternatively may be carried out.

The chloride-containing material may be calcium chloride, sodium chloride, magnesium chloride, ferrous chloride, hydrogen chloride or other suitable chloride. Mixtures of these materials may be employed, for example, a mixture of calcium chloride and sodium chloride. When the chloride is hydrogen chloride, and this material is added to a garnierite ore containing iron and magnesium, the corresponding metal chlorides may be formed. The hydrogen chloride generally is added as hydrochloric acid, and the remaining chlorides either as solids or as aqueous solutions. The chloride preferably is calcium chloride since this material has been found to give the most satisfactory results.

The quantity of chloride employed depends on the nickel content of the ore. Quantities of around 5% by weight based upon the substantially dry weight of the ore have been found satisfactory, although smaller and larger amounts may be utilized.

The magnetic iron-containing material preferably is metallic iron in finely divided form, for example, sponge iron. Magnetic iron compounds, such as iron sulphide, may be employed. The iron particles may be of any convenient size to obtain an intimate mixture with comminuted ore. Iron particles of size 80 mesh or smaller have been found satisfactory, although other particle fractions, for example, —80 +325 mesh and also larger particles, for example, —14 +28 mesh may be employed.

The quantity of iron material generally is dependent upon the quantity of chloride employed. Generally, a weight ratio of about 2:1 is maintained for iron:chloride. Therefore, quantities of iron material of around 10% by weight based on the substantially dry weight of the ore are preferably employed.

The sponge iron utilized in the process may be prepared from limonite or garnierite ores, preferably limonite ore since it contains larger quantities of iron. Such sponge iron contains small quantities of nickel from the original ore and this nickel is recovered in the process of the invention. Such sponge iron may be formed in conventional manner, for example, by high temperature reduction, such as, by use of coke.

The garnierite or limonite ore from which the sponge iron is formed may be part of that being processed to recover the nickel. For example, a quantity of garnierite ore may be reduced to recover sponge iron and then the remainder of the ore is added to this sponge iron, either in the same or a different vessel, together with the chloride, and the mixture heated to the reaction temperature to recover nickel. The sponge iron, therefore, may be formed in the same reaction vessel as the one in which the main reaction is to occur or in a separate vessel.

The ore may be subjected to a number of steps prior to reaction with the chloride and iron material. Thus, the ore may be comminuted, preferably to a particle size of around —100 mesh. This comminution allows intimate mixtures to be made of the ore with the reactants.

The ore preferably is subjected to a calcining step prior to reaction with the chloride-containing material and iron-containing material. Such calcining step preferably is carried out in an inert atmosphere, for example, a stream of nitrogen gas is passed over the ore, and has the effect of removing free and combined water from the ore. It has been found that better yields of nickel are obtained where the ore is subjected to such calcining step.

The calcining may be carried out in the presence of air but inferior results have been obtained under these conditions. Combustion products may be used to provide an inert atmosphere.

The calcining step is carried out at high temperature, generally at around 1400° F. or above and preferably about 1500° to 1900° F., for about ½ to 2 hours. The temperature of the calcining step generally is below that of the reaction between the ore and the chloride and iron material, although the calcining step may be carried out at the same temperature as the reaction step.

It is preferred that the reaction between the calcined ore and the chloride-containing material and iron-containing material, either in sequential or simultaneous reaction, occur following the calcining without intermediate cooling. Where such intermediate cooling is carried out, it is preferably carried out in an inert atmosphere.

Alternatively, the ore may be subjected to a reducing step prior to reaction with the chloride-containing material and the iron-containing material. The reduction may be achieved using carbon monoxide gas or carbon mixed with the ore. This reduction is intended to reduce the nickel oxide content of the ore to nickel metal and the iron oxide content of the ore to ferrous oxide and some metallic iron. The inclusion of this reducing step has not, however, led to improved yields.

The reaction between the ore and the chloride-containing material and the iron-containing material, whether accomplished simultaneously or sequentially, generally is carried out by roasting at a temperature of about 1500° F. or above, and preferably about 1600° F. to 2000° F., for about ½ to 1 hour. At the end of the reaction, the products are cooled down, preferably maintaining an inert atmosphere throughout the cooling.

The roasting step and calcining step if employed may be carried out in a rotating kiln constructed of any convenient material, for example, stainless steel or other steel having a ceramic lining. Alternatively, a fluid bed process may be employed.

The nickel metal generally is recovered in the form of a nickel-iron alloy formed with excess iron in the system. Such an alloy is useful in the formation of stainless steel. In addition to the nickel, cobalt values of the original ore are recovered in the alloy. Alternatively, the nickel values may be recovered at least partly as metallic nickel often in admixture or solid solution with nickel-iron alloy and metallic iron. Typically, products are obtained having about 15 to about 50% concentration of nickel, with the recovery of nickel from the ore being about 70 to 90%.

The nickel metal or alloy may be separated from the remaining materials by lightly grinding the roasted material followed by dry or wet magnetic separation.

While the applicant does not wish to be bound by any theory to explain the process of the invention, it is nevertheless theorized that the nickel silicate present in the ore reacts with the chloride to produce nickel chloride. For example,

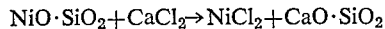
$$NiO \cdot SiO_2 + CaCl_2 \rightarrow NiCl_2 + CaO \cdot SiO_2$$

The nickel chloride then reacts with the iron to replace the nickel ions by iron ions, thereby releasing metallic nickel and forming iron chloride, viz

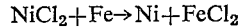
$$NiCl_2 + Fe \rightarrow Ni + FeCl_2$$

The process is further described by way of illustration with reference to the accompanying drawing, which is a schematic flow sheet of one embodiment of the invention.

A limonite ore, generally containing about 50% iron, is fed by line 10 to a kiln 12 wherein sponge iron is formed. This may be achieved in any convenient manner, for example, by reduction using coke in an inert atmosphere at about 2000° F. to 2600° F. for 1 hour. The sponge iron, after separation from unreacted coke is comminuted to the desired particle size and separated from gangue materials.

Garnierite ore, containing commonly about 1 to 3% nickel and about 20% iron is fed by line 14 to a calciner/roaster 16. The ore is calcined at about 1500° F. to about 1900° F. for approximately 1 hour in an inert atmosphere maintained by a stream of nitrogen or combustion products gas passing through the calciner/roaster 16. At the end of the calcining, sponge iron is fed through line 18 to the calciner/roaster 16 and calcium chloride is fed through line 20 to the calciner/roaster 16. These materials are mixed with the calcined ore to provide an intimate mixture. Sufficient sponge iron and calcium chloride may be added to provide 10% by weight of ore of sponge iron and 5% by weight of calcium chloride. Any sponge iron not provided from the kiln 12 may be provided by line 22.

The intimate mixture of reactants then is roasted at about 1600° F. to about 2000° F. for about an hour, maintaining the same inert atmosphere as in the calcining step.

At the end of the roasting step, the products are cooled and passed to a separator 24 by line 26. In the separator 24, the products are subjected to wet or dry magnetic separation. The magnetic products, rich in nickel are recovered by line 28, while the tailings are discarded through line 30.

The invention is illustrated by the following examples. In all of the examples, the ore was a garnierite ore consisting predominantly of goethite ($Fe_2O_3 \cdot H_2O$) and serpentine ($3MgO \cdot 2SiO_2 \cdot 2H_2O$) in which nickel replaced part of the magnesium. The ore was analyzed and found to contain 2.25% by weight of nickel and 19.6% by weight of iron.

EXAMPLE 1

50 g. of substantially dry garnierite ore ground to approximately —50 mesh size was subjected to reduction in an atmosphere containing 40% by volume hydrogen and 60% by volume water vapor at a temperature of about 1600° F. for about 2 hours. The reactor was continuously rotated during the reduction.

At the end of the 2-hour reduction, the reactor was cooled and the material maintained under a nitrogen atmosphere. To the cooled reduced ore was added 2.5 g. (5% by weight) calcium chloride and 5.0 g. (10% by weight) of iron powder. 30 g. of this mixture was roasted at about 1800° F. for about an hour under a nitrogen atmosphere. The reactor was continuously rotated. The inert atmosphere was maintained while the product cooled down after the completion of the roasting operation.

The roasted product was lightly ground and subjected to wet magnetic separation. 5.54 g. representing 18.5 weight percent of the total product of magnetics fraction were recovered. The magnetics fraction on analysis was found to contain 8.96% nickel indicating a nickel recovery from the ore of approximately 57.9%.

EXAMPLE 2

50 g. of garnierite ore ground to approximately —50 mesh was calcined in a nitrogen atmosphere for 2 hours at 1600° F. Such calcined ore was mixed with 2.5 g. (5% by weight) of calcium chloride and 5.0 g. (10% by weight) of iron powder. 30 g. of this mixture was roasted at about 1800° F. for about an hour under a nitrogen atmosphere. The reactor was continuously rotated. The inert atmosphere was maintained while the product cooled down after the completion of the roasting operation.

The roasted product was lightly ground and subjected to wet magnetic separation. 2.96 g. representing 9.9 weight percent of the total product of magnetics fraction were recovered, which on analysis was found to contain 26.2% nickel, indicating a nickel recovery from the ore of approximately 88.9%.

It will also be seen from comparison of the results of Examples 1 and 2 that initial calcining in an inert atmosphere gives superior results in terms of percentage nickel recovered and nickel content of magnetic products to subjecting the ore to an initial reduction.

EXAMPLE 3

50 g. of garnierite ore ground to approximately —100 mesh was calcined at 1600° F. for about 2 hours in the stainless steel reactor.

Anhydrous crushed calcium chloride and —80 mesh iron powder were added to the calcined ore and intimately mixed therewith, in quantites of 5% by weight of calcium chloride and 10% by weight of iron powder.

The intimate mixture then was roasted at 1800° F. for 1 hour and the roasted material cooled. A flow of nitrogen gas at a rate of 1.2 s.c.f.h. was maintained throughout the operations and the reactor was continuously rotated. The roasted ore was found to contain 2.32% by weight of nickel.

After lightly grinding the product to about —65 mesh, the material was subjected to wet magnetic separation. A magnetics fraction representing 5.4% by weight of the total solids was recovered and found to contain 36.6% by weight of nickel, representing an 85.2% recovery of nickel from the original ore. The magnetic fraction was found to contain 0.70% by weight of cobalt, representing approximately 57% recovery of the amount of cobalt in the calcined ore.

EXAMPLE 4

Example 3 was repeated using a reactor having a mullite ceramic liner. The ore after roasting was found to contain 2.14% by weight of nickel. After magnetic separation; the magnetics fraction, representing 8.4% by weight of the total solids, contained 21.4% by weight of nickel representing a recovery of 80.6% of the original nickel content of the ore.

EXAMPLE 5

Example 3 was repeated using a reactor having a mullite ceramic liner, and the ore was calcined for ½ hour at 1800° F. The ore after roasting was found to have a nickel content of 2.44% by weight. After magnetic separation, the magnetics fraction representing 3.3% by weight of the total solids recovered; assayed 53.0% by weight of nickel, i.e. a 72.4% recovery of nickel from the ore.

EXAMPLE 6

Example 5 was repeated using 10% by weight of iron powder having —60 +325 mesh particle sizes. The nickel content of the roasted ore was 2.23% by weight. After magnetic separation, the magnetics fraction representing 4.7% by weight of the total solids product, was found to contain 40.6% by weight of nickel, or 85.5% total recovery of nickel from the ore.

EXAMPLE 7

Example 3 was repeated using a reactor having a mullite ceramic liner, and the ore was calcined for ½ hour at 1700° F. The roasted ore contained 2.15% by weight of nickel. The magnetics fraction, which was 3.8% by weight of the solids products, contained 47.5% by weight of nickel representing a recovery of 83.9% of the nickel content of the ore.

EXAMPLE 8

50 g. of garnierite ore were ground to approximately —100 mesh and calcined at 1600° F. for ½ hour in the reactor containing a mullite ceramic liner.

2.5 g. of anhydrous, crushed calcium chloride and 5 g. of —80 mesh iron powder were intimately mixed with the calcined ore. The intimate mixture then was roasted at 1800° F. for ½ hour and the roasted material cooled. The ore, after roasting, was found to contain 2.11% by weight of nickel.

A flow of nitrogen gas at a rate of 1.2 s.c.f.h. was maintained in the reactor, and the reactor was rotated throughout the calcining, mixing, roasting, and cooling operations.

The cooled product was lightly ground to about —65 mesh and subjected to dry magnetic separation. The magnetics fraction recovered represented 5.0% by weight of the total solids products and contained 36.2% by weight of nickel, i.e. a nickel recovery of 86.0% from the ore.

EXAMPLE 9

50 g. of garnierite ore was ground to approximately —100 mesh. 1.25 g. (i.e. 2½% by weight of ore) of iron powder of —80 mesh was mixed with the ground ore and the mixture calcined at 1600° F. for ½ hour in the reactor with a ceramic liner.

2.5 g. (i.e. 5% by weight of ore) of anhydrous crushed calcium chloride and 3.75 g. (i.e. 7.5% by weight of ore) of —80 mesh iron powder were intimately mixed with the calcined ore. The intimate mixture then was roasted at 1800° F. for 1 hour and after that time the roasted material cooled. The ore after roasting was found to contain 2.22% by weight of nickel.

A flow of nitrogen gas at a rate of 1.2 s.c.f.h. was maintained in the reactor and the reactor was rotated throughout the various above-described operations.

The solid product was subjected to wet magnetic separation to recover as 5% by weight of the total solids product a magnetics fraction, which was found to contain 39.2% by weight of nickel. This quantity of nickel represents a recovery of 87.7% of the original nickel content of the ore.

EXAMPLE 10

Example 3 was repeated, using 10% by weight of powder having —60 +325 mesh particle size, calcining at 1700° F. for ½ hour and roasting at 1700° F. for 1 hour. The nickel content of the roasted ore was 2.32% by weight. The recovered magnetics fraction was 4.4% by weight of the total and assayed a nickel content of 40.0% by weight, i.e. a 76.4% recovery from the ore.

EXAMPLE 11

Example 3 was repeated, calcining at 1600° F. for ½ hour. 10% by weight of sponge iron of —65 mesh prepared from limonite ore was utilized. The nickel content of the roasted ore was 2.62%. After magnetic separation, the magnetics fraction, constituting 8.7% of the total solid product, was found to contain 24.25% by weight of nickel, or an 80.2% total recovery of nickel, or about 70.8% recovery of the total nickel contained in the ore and the limonite from the ore.

EXAMPLES 12–18

To illustrate the applicability of the process of this invention to chlorides other than calcium chloride, a number of experiments were carried out employing broadly the technique of Example 3. In each case, the magnetics fraction was assayed for nickel content. The results are reproduced in the following Table I.

38.1%. The low recovery of nickel as compared to that of Example 3 where —80 mesh iron powder is utilized, is probably due to the coarseness of the particles exhibiting a greatly reduced surface area for reaction.

Modifications are possible within the scope of the invention.

What I claim is:

1. A process for the recovery of nickel which comprises admixing particulate nickeliferous-laterite ore, a particulate chloride-containing material and a magnetic iron-containing material selected from particulate iron and particulate iron sulphite to provide an intimate admixture consisting of said materials, roasting said intimate admixture at a temperature to effect solely an in situ reaction between the bound nickel in the nickeliferous ore and the chloride-containing material to form nickel chloride and, substantially simultaneously with the formation thereof, reduction of the nickel chloride to nickel by the magnetic iron-containing material, and recovering metallic nickel from the roasted mixture.

2. The process of claim 1 wherein said nickeliferous ore is a nickeliferous-laterite ore.

TABLE I

| Example number | Chloride and quantity | Reactor | Calcining conditions | Ni content of roasted ore, percent | Roasting conditions | Percent by wt. magnetics fraction | Percent Ni | Percent Ni recovery |
|---|---|---|---|---|---|---|---|---|
| 12 | 5% NaCl | SS tube [1] | 1,600° F., 2 hours | 2.17 | 1,800° F., 1 hour | 7.5 | 18.20 | 63.2 |
| 13 | 7% NaCl | Ceramic liner | 1,800° F., ½ hour | 2.05 | do | 7.7 | 4.19 | 15.8 |
| 14 | 7% NaCl | SS tube [1] | do | 2.16 | do | 16.5 | 8.88 | 67.9 |
| 15 | 5% MgCl₂ | Ceramic liner | do | 2.14 | do | 2.7 | 53.12 | 67.8 |
| 16 | 5% FeCl₂ | do | do | 2.12 | do | 2.9 | 51.46 | 71.2 |
| 17 | 5% NaCl plus 2.5% CaO | do | do | 2.02 | do | 5.7 | 9.86 | 27.9 |
| 18 | 3% NaCl plus 3% CaCl₂ | do | do | 2.04 | do | 1.5 | 23.70 | 17.4 |

[1] SS=stainless steel.

EXAMPLE 19

Example 3 was repeated calcining at 1700° F. for ½ hour and using 6% by weight of —80 mesh iron powder. The calcined ore contained 2.13% by weight of nickel. A recovery of 6.8% of nickel only was obtained, i.e. 6.20% by weight of the magnetics fraction.

EXAMPLE 20

Example 3 was repeated calcining at 1700° F. for ½ hour and using 14% by weight of —80 mesh iron powder. The calcined ore contained 2.20% by weight of nickel. The magnetics fraction recovered, constituting 20.2% by weight of the total solids product, contained 9.02% by weight of nickel, i.e. 83% recovery of nickel.

EXAMPLE 21

Example 3 was repeated calcining at 1700° F. for ½ hour and using 3% by weight of anhydrous calcium chloride. The calcined ore contained 2.10% by weight of nickel. The nickel content of the magnetics fraction was 9.74% by weight. The magnetics fraction was 16.0% by weight of the total solids product, and hence the nickel recovery was 74.4%.

EXAMPLE 22

Example 3 was repeated calcining at 1700° F. for ½ hour and using 10% by weight of ferrous sulphide in the form of pyrrhotite. The calcined ore contained 2.16% by weight of nickel. The recovery of nickel from the ore was 11.5%, or 11.0% by weight of the magnetics fraction, itself 2.3% by weight of the total. While the recovery of nickel is low, this example illustrates the feasibility of using magnetic iron compounds in the process of the invention.

EXAMPLE 23

Example 3 was repeated calcining at 1700° F. for ½ hour and using 10% by weight of iron chips having a particle size of —14 +28 mesh. In addition, the iron chips were screened from the roasted product rather than magnetically separated. Recovery of nickel from the ore was 3. The process of claim 2 wherein said nickeliferous-laterite ore is garnierite.

4. The process of claim 1 wherein said magnetic iron-containing material is sponge iron derived from limonite ore.

5. The process of claim 1 wherein said magnetic iron-containing material is sponge iron derived from garnierite ore.

6. The process of claim 1 wherein said chloride-containing material is selected from calcium chloride, sodium chloride, magnesium chloride, ferrous chloride and hydrogen chloride.

7. A process for the recovery of nickel which comprises calcining a nickeliferous ore to remove at least a substantial portion of the free water and combined water therefrom, roasting said calcined ore solely in intimate admixture with a chloride-containing material formed at least in part in situ from said ore and a magnetic iron-containing material selected from particulate iron and particulate iron sulphide at a high temperature to effect solely an in situ reaction between the bound nickel in the nickeliferous ore and the chloride-containing material to form nickel chloride and, substantially simultaneously with the formation thereof, reduction of the nickel chloride to nickel by the iron-containing material, and recover metallic nickel from said roasted mixture.

8. A process for the recovery of nickel which comprises calcining a nickeliferous-laterite ore to remove at least a substantial portion of the free water and combined water therefrom, admixing said calcined ore in particulate form, a particulate chloride-containing material and a magnetic iron-containing material selected from particulate iron and particulate iron sulphide to provide an intimate admixture consisting of said materials, roasting said admixture at a high temperature to effect solely an in situ reaction between the bound nickel in the nickeliferous ore and the chloride-containing material to form nickel chloride and, substantially simultaneously with the formation thereof, reduction of the nickel chloride to nickel by the iron-containing material, and recovering metallic nickel from said roasted mixture.

9. The process of claim 8 wherein said nickeliferous ore is garnierite.

10. The process of claim 9 wherein said ore is garnierite comminuted to approximately —100 mesh particle size, said chloride-containing material is particulate calcium chloride and said magnetic iron-containing material is sponge iron having a particle size of approximately —80 mesh.

11. The process of claim 8 wherein said chloride-containing material is calcium chloride.

12. The process of claim 8 including the step of forming said magnetic iron-containing material from part of said ore.

13. The process of claim 8 wherein said magnetic iron-containing material is sponge iron.

14. The process of claim 13 wherein said sponge iron is derived from limonite ore.

15. The process of claim 13 wherein said sponge iron is derived from garnierite ore.

16. The process of claim 8 wherein said chloride-containing material is selected from calcium chloride, sodium chloride, magnesium chloride, ferrous chloride and hydrogen chloride.

17. The process of claim 8 wherein said calcining and roasting steps are carried out simultaneously.

18. The process of claim 8 wherein said calcining is carried out at a temperature of about 1500° to 1900° F. for ½ to 2 hours.

19. The process of claim 8 wherein said roasting is carried out at a temperature of about 1600° to 2000° F. for ½ to 1 hour.

20. The process of claim 8 wherein an inert atmosphere is maintained during said calcining and roasting steps.

21. A process for the recovery of nickel which comprises calcining a nickeliferous-laterite ore to remove at least a substantial portion of the free water and combined water therefrom, admixing said calcined ore in particulate form, about 3% to about 5% by weight of said ore of a particulate chloride and about 6% to about 14% by weight of said ore of particulate iron to provide an intimate admixture consisting of said materials, roasting said admixture at a high temperature to effect solely an in situ reaction between the bound nickel in the nickeliferous ore and the chloride-containing material to form nickel chloride and, substantially simultaneously with the formation thereof, reduction of the nickel chloride to nickel by said iron and recovering metallic nickel from said roasted mixture.

22. The process of claim 21 wherein about 5% by weight of particulate calcium chloride and approximately 10% by weight of sponge iron, based on the weight of the ore, are mixed with the calcined ore prior to roasting.

References Cited

UNITED STATES PATENTS

| | | | |
|---|---|---|---|
| 180,142 | 7/1876 | Mason | 75—82 |
| 191,728 | 6/1877 | Tatro | 75—82 |
| 2,067,874 | 1/1937 | Brown et al. | 75—82 X |
| 3,453,101 | 7/1969 | Takahashi et al. | 75—82 X |
| 2,030,867 | 2/1936 | Hart | 75—113 X |
| 1,817,865 | 8/1931 | Ashcroft | 75—113 X |
| 2,396,792 | 3/1946 | Kroll | 75—82 |
| 2,396,793 | 3/1946 | Kroll | 75—82 |
| 2,396,794 | 3/1946 | Kroll | 75—82 |
| 2,677,593 | 5/1954 | Graham et al. | 75—82 X |
| 2,702,738 | 2/1955 | Graham et al. | 75—82 X |
| 3,656,935 | 4/1972 | Iwasaki | 75—82 |

HYLAND BIZOT, Primary Examiner

M. J. ANDREWS, Assistant Examiner

U.S. Cl. X.R.

75—2, 21, 133.5

Notice of Adverse Decision in Interference

In Interference No. 98,740, involving Patent No. 3,761,245, S. P. Bingham, NICKEL SEGREGATION PROCESS USING METALLIC IRON AS REDUCTANT, final judgment adverse to the patentee was rendered July 26, 1976, as to claims 1, 2, 6, 8, 11, 16, 17, 18 and 19.

[*Official Gazette May 3, 1977.*]